(12) United States Patent
Jasinschi

(10) Patent No.: US 7,305,618 B2
(45) Date of Patent: Dec. 4, 2007

(54) METHODS FOR MULTIMEDIA CONTENT REPURPOSING

(75) Inventor: Radu Serban Jasinschi, Nuenen (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 379 days.

(21) Appl. No.: 10/265,582

(22) Filed: Oct. 7, 2002

(65) Prior Publication Data

US 2003/0103074 A1   Jun. 5, 2003

Related U.S. Application Data

(63) Continuation-in-part of application No. 10/011,883, filed on Dec. 4, 2001.

(51) Int. Cl.
*G06F 17/00* (2006.01)

(52) U.S. Cl. .............. 715/523; 715/500.1; 715/517; 707/104.1; 375/240.08; 382/243; 382/294

(58) Field of Classification Search .......... 715/500.1, 715/776, 732, 726, 723, 517, 523; 707/104.1; 375/240.08, 240.12; 382/236, 294, 181, 382/250, 243

See application file for complete search history.

(56) References Cited

U.S. PATENT DOCUMENTS

| | | | | |
|---|---|---|---|---|
| 5,103,306 A * | 4/1992 | Weiman et al. | ........... | 348/400.1 |
| 5,430,496 A * | 7/1995 | Silverbrook | ................ | 348/589 |
| 5,611,038 A * | 3/1997 | Shaw et al. | .............. | 715/500.1 |
| 5,640,560 A * | 6/1997 | Smith | ....................... | 707/104.1 |
| 5,689,591 A * | 11/1997 | Balram et al. | .............. | 382/276 |
| 5,699,124 A * | 12/1997 | Nuber et al. | ................. | 348/465 |
| 5,727,159 A * | 3/1998 | Kikinis | ........................ | 709/246 |
| 5,854,856 A * | 12/1998 | Moura et al. | .............. | 382/232 |
| 5,915,044 A * | 6/1999 | Gardos et al. | .............. | 382/236 |
| 5,969,716 A * | 10/1999 | Davis et al. | ................. | 715/726 |
| 6,075,875 A * | 6/2000 | Gu | ............................. | 382/107 |
| 6,078,701 A * | 6/2000 | Hsu et al. | .................... | 382/294 |
| 6,115,035 A * | 9/2000 | Compton et al. | ........... | 715/717 |
| 6,128,668 A * | 10/2000 | Barber et al. | ............... | 709/246 |
| 6,147,692 A * | 11/2000 | Shaw et al. | .................. | 345/643 |
| 6,161,114 A * | 12/2000 | King et al. | .................. | 715/517 |
| 6,236,395 B1 * | 5/2001 | Sezan et al. | ................. | 715/723 |
| 6,249,613 B1 * | 6/2001 | Crinon et al. | ............... | 382/236 |
| 6,259,828 B1 * | 7/2001 | Crinon et al. | ............... | 382/305 |
| 6,331,865 B1 * | 12/2001 | Sachs et al. | ................. | 715/776 |
| 6,345,279 B1 * | 2/2002 | Li et al. | ................... | 707/104.1 |

(Continued)

OTHER PUBLICATIONS

Obrenovic et al., "A Model-Driven Approach to Content Repurposing", Copyright 2004, IEEE pp. 62-71.*

(Continued)

*Primary Examiner*—Doug Hutton
*Assistant Examiner*—James H Blackwell
(74) *Attorney, Agent, or Firm*—Yan Glickberg

(57) ABSTRACT

Comprehensive multimedia content re-purposing relating to wireless communications employs content constructs that are compact representations of the content information. For video content, the constructs are content operators that represent 2D image regions and/or 3D volumetric regions for objects within the sequence and characterized by various visual attributes, and are extracted from the video sequence by segmentation utilizing video processing techniques. The constructs are employed for intra- and inter-modality transformation to accommodate resource constraints of the mobile device.

18 Claims, 3 Drawing Sheets

U.S. PATENT DOCUMENTS

| | | | |
|---|---|---|---|
| 6,356,664 B1* | 3/2002 | Dunn et al. | 382/239 |
| 6,504,569 B1* | 1/2003 | Jasinschi et al. | 348/43 |
| 6,542,546 B1* | 4/2003 | Vetro et al. | 375/240.12 |
| 6,553,150 B1* | 4/2003 | Wee et al. | 382/243 |
| 6,574,279 B1* | 6/2003 | Vetro et al. | 375/240.08 |
| 6,616,700 B1* | 9/2003 | Thum et al. | 715/500.1 |
| 6,625,320 B1* | 9/2003 | Nilsson et al. | 382/238 |
| 6,678,413 B1* | 1/2004 | Liang et al. | 382/181 |
| 6,711,587 B1* | 3/2004 | Dufaux | 707/104.1 |
| 6,724,817 B1* | 4/2004 | Simpson et al. | 375/240.07 |
| 6,738,424 B1* | 5/2004 | Allmen et al. | 375/240.08 |
| 6,810,144 B2* | 10/2004 | McGee et al. | 382/166 |
| 6,925,501 B2* | 8/2005 | Wang et al. | 709/231 |
| 6,954,498 B1* | 10/2005 | Lipton | 375/240.08 |
| 2001/0013123 A1* | 8/2001 | Freeman et al. | 725/34 |
| 2002/0018075 A1* | 2/2002 | Maulik et al. | 345/732 |
| 2002/0111972 A1* | 8/2002 | Lynch et al. | 707/523 |
| 2002/0129067 A1* | 9/2002 | Dames et al. | 707/523 |
| 2004/0205650 A1* | 10/2004 | Cheng | 715/530 |

OTHER PUBLICATIONS

Jasinschi et al.,"Video Compression Via COnstructs", Copyright 1995, IEE, pp. 2165-2168.*

Smith et al.,"Content-Based Transcoding of Images In The Internet", Copyright 1998, IEEE, pp. 7-11.*

Dumitras et al.,"Content-based Movie Coding—An Overview", Copyright 2002, IEEE, pp. 89-92.*

Jasinschi et al.,"Content-ased Video Sequence Representation", Copyright 1995, IEEE, pp. 229-232.*

Hauptmann et al.,"Text, SPeech, and Vision for Tideo Segmentation: The Informedia™ Project", Carnegie Mellon Univ., 1995, 6 pages.*

Jehan-Besson et al.,"Video Object Segmentation Using Eulerian Region-Based Active Contours", 2001, Intl. COnf. in Computer Vision, 8 pages.*

Dimitrova,"Multimedia Content Analysis and Indexing Filtering and Retrieval Applications", Philips Research, 1999, pp. 87-100.*

"Adapting Multimedia Internet Content for Universal Access", by Rakesh Mohan et al., IEEE Transactions on Multimedia, vol. 1, No. 1, Mar. 1999. pp. 104-114.

"Re-Purposing of Content and Digital Delivery Covergence: Implications for Interfact Design", by Slavko Milekic.

"Content Repurposing Theory , The Belle Project".

"Strategies in Re-Purposing Graphics for Interactive Intelligent Delivery", by Jeremiah Woolsey et al.

* cited by examiner

METHODS FOR MULTIMEDIA CONTENT REPURPOSING

CROSS-REFERENCE TO RELATED APPLICATION(S)

This application claims priority as a continuation-in-part of U.S. patent application Ser. No. 10/011,883 entitled DISTRIBUTED PROCESSING, STORAGE AND TRANSMISSION OF MULTIMEDIA INFORMATION filed Dec. 4, 2001. The content of the above-identified application(s) is incorporated herein by reference.

TECHNICAL FIELD OF THE INVENTION

The present invention is directed, in general, to multimedia content transcoding and, more specifically, to intra- and inter-modality multimedia content transcoding for use under resource constraints of mobile devices.

BACKGROUND OF THE INVENTION

Multimedia content may take the form of one of the three distinct modalities of audio, visual, and textual, or any combination thereof. Content "re-purposing" refers generally and theoretically to re-formatting, re-scaling, and/or transcoding content by changing the content representation within a given domain, such as: from video to video, video to still graphic images, or natural pictures to cartoons in the visual domain; from natural to synthetic sound in the audio domain; and from full text to summaries in the textual domain. In addition, content may be re-purposed by changing from one domain to another, such as from video to text or from audio to text.

A primary use of content re-purposing is to enable the processing, storage, transmission and display of multimedia information on mobile (e.g., wireless) devices. Such devices typically have very stringent limitations on processing, storage, transmission/reception and display capabilities. Through content re-purposing, a mobile device user may have constant access to multimedia information with variable quality depending upon the circumstances, and by using the best available multimedia modality.

Current content re-purposing implementations include primarily speech-to-text, where spoken sounds are analyzed to transform them into vowels and consonants for translation into text to be employed, for example, in answering or response (dial-in) systems. Summarization, which deals almost exclusively with textual information, is also employed.

There is, therefore, a need in the art for improved techniques for content re-purposing directed to more general uses.

SUMMARY OF THE INVENTION

To address the above-discussed deficiencies of the prior art, it is a primary object of the present invention to provide, for use in wireless communications system, comprehensive multimedia content re-purposing employing content constructs that are compact representations of the content information. For video content, the constructs are content operators that represent 2D image regions and/or 3D volumetric regions for objects within the sequence and characterized by various visual attributes, and are extracted from the video sequence by segmentation utilizing video processing techniques. The constructs are employed for intra- and inter-modality transformation to accommodate resource constraints of the mobile device.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
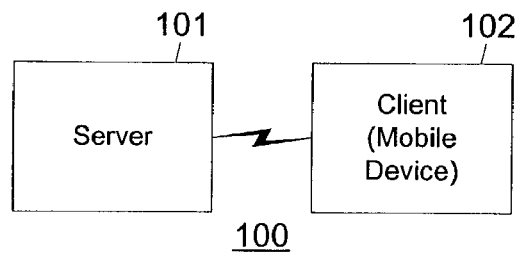
FIG. 1 depicts a data processing system network employing content re-purposing according to one embodiment of the present invention.
Figure 2A:
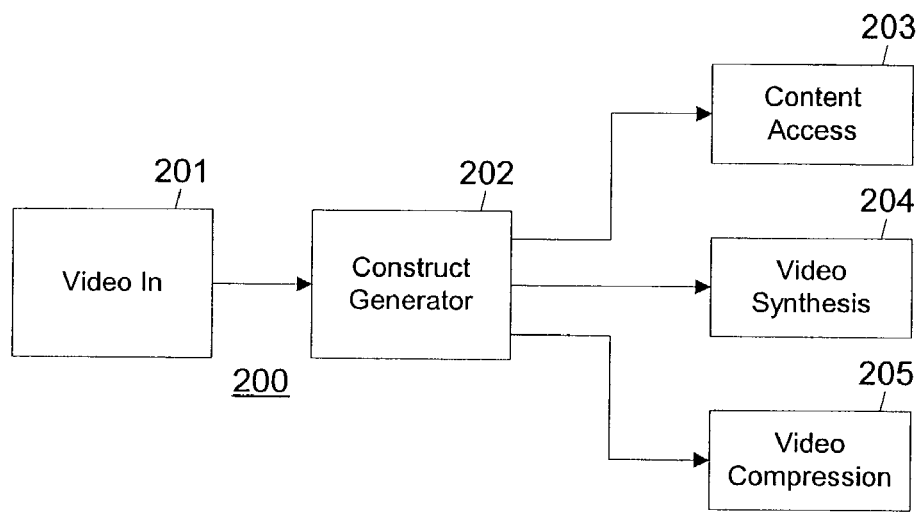
FIGS. 2A through 2C illustrate intra-modality visual content re-purposing according to one embodiment of the present invention.
Figure 2B:
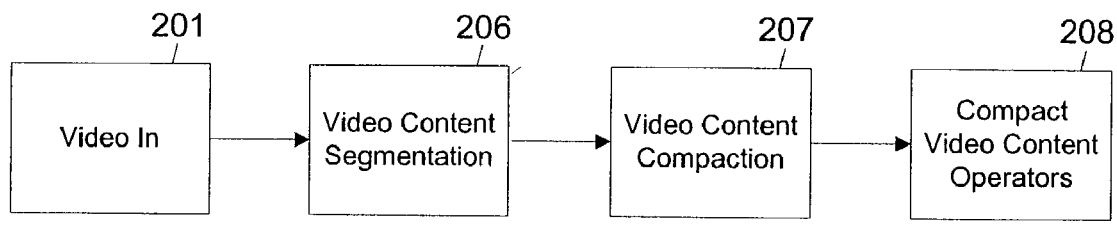
Figure 2C:
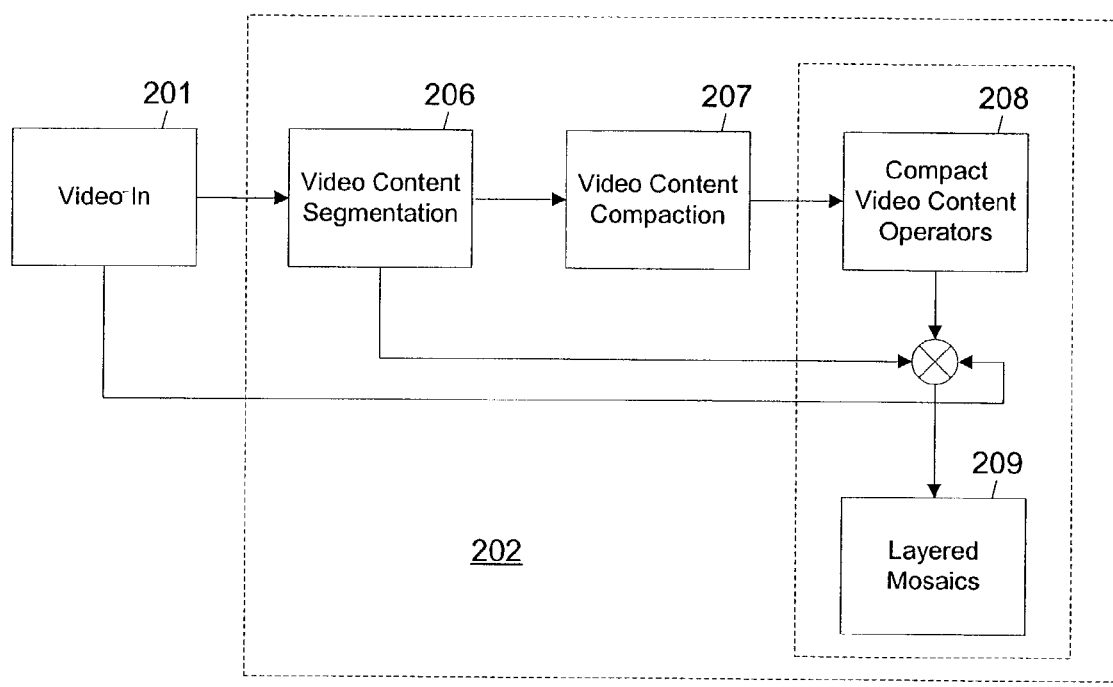
Figure 3:
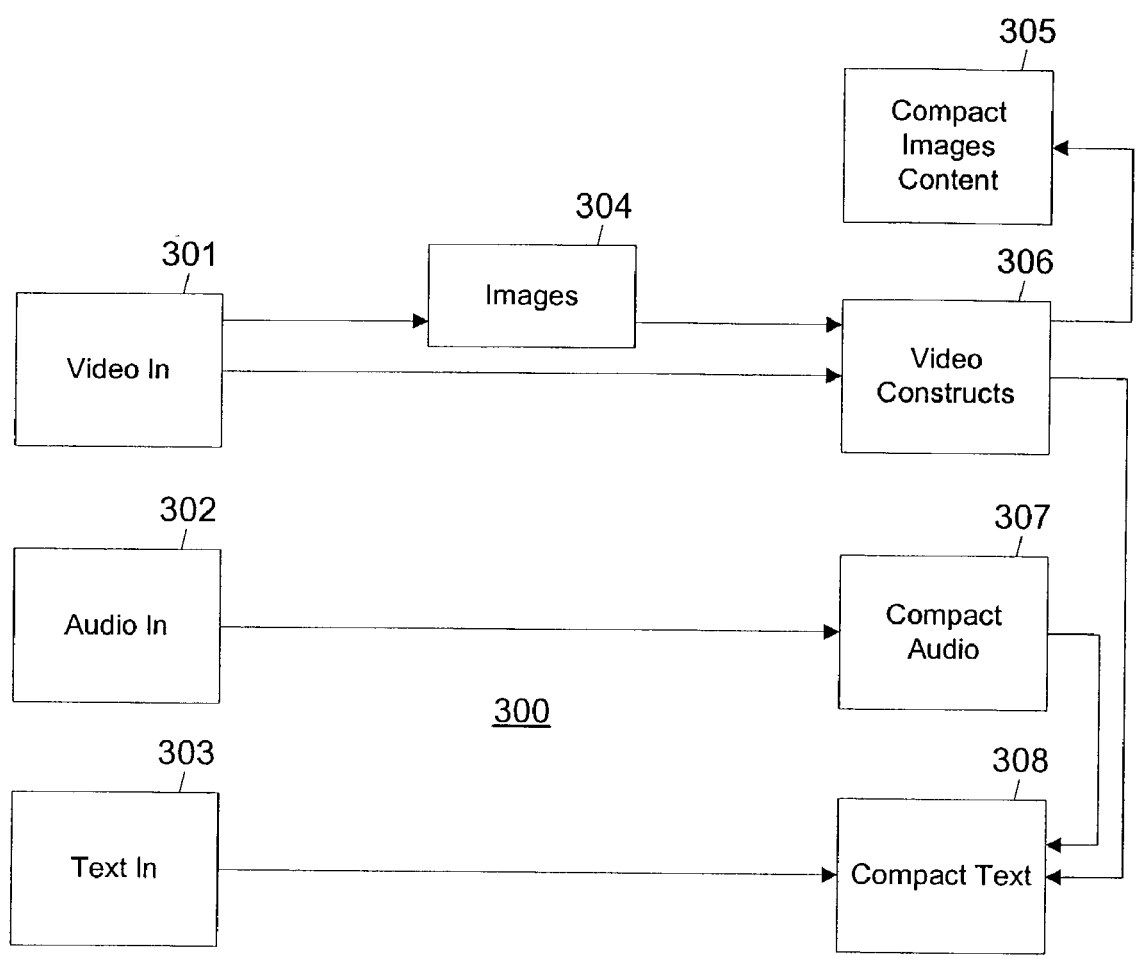
FIG. 3 illustrates inter-modality content re-purposing utilizing compact information according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a data processing system network employing content re-purposing according to one embodiment of the present invention. The data processing system network 100 includes a server system 101 and a client system 102. In the example shown, the server 101 and client 102 are wirelessly coupled and interoperable. The server 101 may be any system, such as a desktop personal computer (PC), a laptop, a "super-computer," or any other system including a central processing unit (CPU), a local memory system, and a set of dedicated chips that perform specific signal processing operations such as convolutions, etc. Data processing system 100 may include any type of wireless communications network, including video, data, voice/audio, or some combination thereof. Mobile (or fixed wirelessly connected) device 102 may be, for example, a telephone, a personal digital assistant (PDA), a computer, a satellite or terrestrial television and/or radio reception system, or a set top box.

Those skilled in the art will recognize that the complete construction and operation of a data processing system network is not depicted in the drawings or described herein. Instead, for simplicity and clarity, only so much of the details of the construction and operation of a data processing system as are either unique to the present invention or necessary for an understanding of the present invention are shown and described. The remainder of the system may be constructed and operate in accordance with conventional practices.

FIGS. 2A through 2C illustrate intra-modality visual content re-purposing according to one embodiment of the present invention. In the exemplary embodiment, server 101 is capable of video sequence and/or static image re-purposing for content delivered to client 102.

For video re-purposing, illustrated in FIG. 2A, a video sequence 201 is transformed into constructs by construct generator 202. The constructs describe elements of a compact video sequence representation, allowing (a) access to video sequence content information 203, synthesis of the original input video sequence 204 (or the creation of a new video sequence), and (c) compression of the video sequence 205. The constructs are each a compact representation of video content information, with a small number of constructs capable of representing long video sequences.

Construct use goes far beyond just video compression and the like. When transforming a video sequence into a set of constructs, the video sequence is actually redesigned into a new set of building blocks. In video coding, for example, a video sequence is represented by frames or fields in their uncompressed form or by video streams in their compressed form. In this representation, the atomic units are pixels or fields (frames) in the uncompressed form and packages in the compressed form, with the representation being unstructured with respect to video content information.

Video content information is mid-level visual content information given by "objects" such as two dimensional (2D) image regions or three dimensional (3D) volumetric regions characterized by various visual attributes (e.g., color, motion, shape). To generate video content information, the information must be segmented from the video sequence, which requires use of various image processing and/or computer vision techniques. For example, edge/shape segmentation, motion analysis (2D or 3D), or color segmentation may be employed for the segmentation process. Moreover, the compact representation of the segmented video content information is also important. FIG. 2B illustrates segmentation and compaction, in which the input video sequence 201 is processed by segmentation and compaction units 206 and 207 to generate compact video content operators 208. The content operators 208 form part of the video content construct set.

Another type of video content constructs is layered mosaics 209, generated by: (i) determining the relative depth information between different mosaics; and (ii) incrementally combining the relative depth information with individual frame from the input source, partial mosaics, and content operators as illustrated in FIG. 2C.

The compact video content operators 208 and the layered mosaics 209 in FIG. 2C constitute video constructs which, together with video content segmentation and compaction units 206 and 207, represent the construct generator 202 of FIG. 2A.

In providing an example of construct generation below, the following visual conditions are assumed: the 3D world (scene) is composed of rigid objects; those objects are distributed at different depth levels forming the scene background, which is static (or at least slowly varying) while the foreground comprises a collection of independently moving (rigid) objects; the objects have a local surface which may be approximated as a plane; and the overall scene illumination is uniform.

Given two successive frames $I_{k-1}$ and $I_k$ taken from a video sequence at instants k−1 and k, respectively, the compact video content operators are generated as follows:

First, register images $I_{k-1}$ and $I_k$ by comparing the image intensities at each pixel. If $I_{k-1}=I_{k-1}(x_{k-1},y_{k-1})$ and $I_k=I_k(x_k,y_k)$, where $(x_{k-1},y_{k-1})$ and $(x_k,y_k)$ represent the x and y coordinate image pixels at instants k−1 and k, respectively, then images $I_{k-1}$ and $I_k$ are registered by computing the nine elements of a 3×3 matrix $R(\bullet,\bullet)$ such that:

$$x_{k-1} = \frac{R(0, 0) \times x_k + R(0, 1) \times y_k + R(0, 2)}{R(2, 0) \times x_k + R(2, 1) \times y_k + R(2, 2)}, \qquad (1)$$

$$y_{k-1} = \frac{R(1, 0) \times x_k + R(1, 1) \times y_k + R(1, 2)}{R(2, 0) \times x_k + R(2, 1) \times y_k + R(2, 2)}. \qquad (2)$$

Matrix $R(\bullet,\bullet)$ may be calculated in different ways, such as by using the (6 parameter) affine model with $R(2,0)=R(2,1)=0$, $R(2,2)=1$, $R(0,0)=s_x$, $R(0,1)=r_x$, $R(1,0)=r_y$, and $R(1,1)=s_y$, where $s_x$, $s_y$, $r_x$ and $r_y$ denote the x and y components of the scaling and rotation (2D) image vectors $\vec{s}$ and $\vec{r}$, respectively. Other suitable models include the 8-parameter perspective model. In any case, the result of registering image $I_{k-1}$ to image $I_k$ is image $I_{k-1}^R$.

Next, image velocity is estimated for the registered images $I_{k-1}$ and $I_k$, utilizing one of many techniques including energy-based and gradient-based. The resulting image velocity determines the pixel velocity of regions associated with 3D rigid objects moving in a uniform manner, and correspond to the foreground 3D objects and associated 2D image regions.

Based on the results of image velocity estimation and other visual attributes, image regions are then segmented to determine the parts associated with the foreground objects. This results in image regions that may be appropriately post-processed to fill in gaps, with associated Alpha maps.

From the image regions, a compact set of shape templates may be generated via computational geometry techniques. A simple representation is in terms of rectangular shape approximations. For example, mosaics are extended planar images encoding non-redundant information about the video sequence, coming in layers according to the associated relative depth of world regions and generated incrementally through recursive algorithms. At each step of such algorithms, comparison of the last previously-generated mosaic with the current video sequence image generates the new instance of the mosaic. In general terms, the generation of layered mosaics begins with a video sequence $\{I_1, \ldots, I_N\}$ made up of N successive frames each having an associated compact Alpha map $\alpha$ within $\{\alpha_1, \ldots \alpha_N\}$. Each Alpha map is obtained from the compact video content operator by filing in the interior of mosaic regions, and is a binary image with ones in the interior region and zeros elsewhere. Assuming that information about relative depth—that is, the relative order of each foreground object and also of all of the foreground objects with respect to the background image—has been employed and that the discrimination between each mosaic plane within L levels is possible, a set of L mosaics $\{\Phi^1, \ldots, \Phi^L\}$, where the $i^{th}$ mosaic $\Phi^i$ is computed in an initial step r=1 by $\Phi_1^i = \alpha_1^i I_1$ and in subsequent steps r=2, ..., N by recursively combining the set of Alpha maps $\{\alpha_2^i, \ldots, \alpha_N^i\}$ with $\{I_1, \ldots, I_N\}$, thereby generating $\Phi_r^i$ for each step r.

Finally, a determination is made of any ancillary information complementing the image regions and shape templates and describing image velocity and other visual attributes necessary to fully represent the video content information.

The result of video construct generation is a set of compact video content operators, a set of layered mosaics, and ancillary information. Image re-purposing is directed to reducing the complexity of the images. For example, the image may be transformed into regions of smooth value of color, brightness, texture, motion, etc. One possible general technique for this task is to minimize the cost function $$E(I, \Gamma) = \int\int_R (I(x,y) - I_M(x,y))^2 dx dy + \int\int_{R-\Gamma} \|\nabla I(x,y)\|^2 dx dy + v|\Gamma|, \quad (3)$$

where $I(\bullet,\bullet)$ denotes the image region R to be estimated, $I_M(\bullet,\bullet)$ denotes the actual (raw) image, and $$\nabla I(x,y) \equiv \left(\frac{\partial I(x,y)}{\partial x}, \frac{\partial I(x,y)}{\partial y}\right). \quad (4)$$

Actually, the image region $R = \cup_i R_i + \Gamma$, and the overall boundary $\Gamma$ encircles the entire region R. The first term in equation (3) determines the "error" between the actual image and the smooth image, the second term determines the "smoothness" term, and the third term is proportional to the boundary length $|\Gamma|$, where $v$ is a constant. For actuation implementation, equation (3) should be appropriately discretized—i.e., approximated by a sum of terms.

In analyzing equation (3), it should be noted that $I(\bullet,\bullet)$ and $I_M(\bullet,\bullet)$ denote the visual attribute being smoothed. For example, if smoothing image velocity $\vec{V}(\bullet,\bullet)$, then $I(\bullet,\bullet) \equiv \vec{V}(\bullet,\bullet)$, etc.

The image may alternatively be transformed into a cartoon image $I_C$ by utilizing a simplified version of equation (3) in which $I(\bullet,\bullet)$ is restricted to piecewise constant values $I(\bullet,\bullet) \to K$. More precisely, for each region $R_i$ the value of $I(\bullet,\bullet)$ is approximated as $I_i(\bullet,\bullet) = K_i$, $K_i$ has a constant real value inside region $R_i$. If $\mu$ is a constant, then equation (3) may be approximated by $$\mu^{-2} E(I, \Gamma) = \sum_i \int\int_{R_i} (I - I_M)^2 dx dy + \nu_0|\Gamma|, \quad (5)$$

where $$\nu = \frac{v}{\mu^2}.$$

It can be seen that $$K_i = \text{mean}_{R_i}(I_M) = \frac{\int\int_{R_i} I_M(x,y) dx dy}{\text{area}(R_i)}. \quad (6)$$

The cartoonification of $I(\bullet,\bullet)$ creates regions with a constant value for a given attribute. A full cartoonification is accomplished when the region boundaries are marked in black. The cartoon image $I_C$ is a very simplified version of the original image that keeps the main characteristics of the original image I.

Visual information transformation from natural to synthetic is one important application of content re-purposing. 3D meshes may be employed for transforming natural 3D objects to synthetic 3D objects; a combination of perspective and projective transformations with 2D meshes may be employed for transforming natural 3D objects to synthetic 2D objects; and 2D meshes and computational geometry tools may be employed for transforming natural 2D objects to synthetic 2D objects.

Audio re-purposing includes speech-to-text transformation according to known techniques, with phonemes being generated by speech recognition and then transformed from phonemes to text. In the present invention, the phonemes should be regarded as a compact set of basic elements by which text information is generated utilizing a dictionary as described in further detail below.

Inter-modality content re-purposing corresponds to re-purposing multimedia information between different modalities. In general, the framework for inter-modality content re-purposing includes (i) multimedia content segmentation, (ii) template/pattern matching; (iii) use of cross-modality translation dictionaries. When dealing with multimedia information, an overall hierarchy with respect to complexity exists in the three constituent elements (visual, audio and textual) as follows:

Visual (video)→Visual (pictures)→Audio→Text. (7)

Therefore, transformations across these different modalities should follow the flow defined in equation (7). While not necessarily dictated as a content hierarchy, this patterned is necessitated by the bits required to represent the content within the various modalities.

One common technique for re-purposing content according to the flow defined by equation (7) is to transform all visual and audio information into textual description. Video to still image transformation is commonly performed by sub-sampling frames of a video sequence, with transformation of content information with respect to point-of-view (or perspective) being less common.

In the present invention, when transforming video to text, a description of the compact video content (video constructs) is given in the textual domain. Similarly, compact image content is transformed to textual description. In video to image transformation, specific regions (information) of the video constructs are accessed by applying compact image content operators to those regions.

FIG. 3 illustrates inter-modality content re-purposing utilizing compact information according to one embodiment of the present invention. Generally, content re-purposing across multimedia modalities is performed in the present invention using compact information (e.g., video constructs, image cartoons). Transformation between compact elements representing a given modality utilizes a compact information format, which is important in transformation from video frames/fields to static frames or text.

Within system 300, separate video, audio and textual inputs 301-303 are employed, with an additional input 304 employed for still images from either an independent input or sub-sampled from video input 301. Compact constructs 305-308 are generated as described above, with inter-modality content re-purposing employing a set of dictionaries (not separately depicted), which translate information between sets of compact content elements in different modalities. Across-modality dictionaries define how the compact content information is described in a given modality, and may be textual and/or based on metadata of a either a proprietary form or employing an agreed standard (e.g., MPEG-7, TV-Anytime, and/or SIMPTE). Translation between elements of different modalities should be performed using these descriptions, which are particularly suited for transforming from video to images. When transforming from video, images or audio to text, the descriptions represent explanations that may be realized at different levels of details. The structure and functionality of dictionaries of this type are described in greater detail in the cross-referenced application identified above and incorporated herein by reference.

The present invention may be implemented on a continuous access content server containing content within a database, to re-purpose content for mobile access of such content. The content may be re-purposed prior to any request for such content by a mobile device (e.g., when the content is loaded for access from the server) or in response to a specific request from a particular device, customizing the content to the resources available within the mobile device. In particular, the present invention may be advantageously employed within wireless communications utilizing Transmission Convergence Protocol (TCP) or Radio Transmission Protocol (RTP) to provide Internet access to customized PDAs, mini-laptops, etc.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A system for multimedia content re-purposing comprising:
   a controller that is configured to generate content constructs that are compact representations of content information and include content operators for video content,
   wherein
   the content operators include:
      segmentation of image regions to identify foreground regions, and
      compaction of the image regions to create individually compacted image regions; and
   the content constructs provide the compacted image regions as a re-purposed transformation of the video content.

2. The system according to claim 1, wherein the content operators for the video content are formed by:
   registering consecutive images within a sequence,
   estimating image velocity for the registered images,
   segmenting the image regions based on the image velocity of the registered images, and
   generating shape templates from the image regions.

3. The system according to claim 1, wherein the content constructs include layered mosaics for the video content that are derived from Alpha maps for consecutive images recursively combined by cut and paste operations.

4. The system according to claim 1, wherein the compaction corresponds to a transformation of the image regions into regions of smooth value for one or more of: color, brightness, texture, and motion.

5. The system according to claim 1, wherein the compaction corresponds to a transformation of the image regions into cartoon-like images.

6. The system according to claim 1, wherein the content constructs include a transformation of the video content to one or more other modalities.

7. A system for multimedia content re-purposing comprising:
   a mobile device capable of selectively accessing multimedia content; and
   a server containing multimedia content for transmission to the mobile device, the server including a controller that is configured to generate content constructs that are compact representations of content information and include content operators for video content,
   wherein
   the content operators include:
      segmentation of image regions to identify foreground regions, and
      compaction of the image regions to create individually compacted image regions; and
   the content constructs provide the compacted image regions as a re-purposed transformation of the video content.

8. The system according to claim 7, wherein the content operators include:
   registering consecutive images within a sequence,
   estimating image velocity for the registered images,
   segmenting the image regions based on the image velocity of the registered images, and
   generating shape templates from the image regions.

9. The system according to claim 7, wherein the content constructs include layered mosaics for the video content that are derived from Alpha maps for consecutive images recursively combined by cut and paste operations.

10. The system according to claim 7, wherein the compaction corresponds to a transformation of the image regions into regions of smooth value for one or more of color, brightness, texture, and motion.

11. The system according to claim 7, wherein the compaction corresponds to a transformation of the image regions into cartoon-like images.

12. The system according to claim 7, wherein the content constructs include a transformation of the video content to one or more other modalities.

13. A method of multimedia content re-purposing comprising:
   generating content constructs that are compact representations of content information and include content operators for video content,
   wherein
   the content operators include:
      segmentation of image regions to identify foreground regions, and
      compaction of the image regions to create individually compacted image regions; and
   the content constructs provide the compacted image regions as a re-purposed transformation of the video content.

14. The method according to claim 13, wherein generating the content operators includes:
   registering consecutive images within a sequence;
   estimating image velocity for the registered images;
   segmenting the image regions based on the image velocity of the registered images, and
   generating shape templates from the image regions.

15. The method according to claim 13, wherein generating the content constructs includes recursively combining Alpha maps for consecutive images by cut and paste operations to form layered mosaics.

16. The method according to claim 13, wherein the compaction corresponds to a transformation of the image regions into regions of smooth value for one or more of color, brightness, texture, and motion.

17. The method according to claim 13, wherein the compaction corresponds to a transformation of the image regions into cartoon-like images.

18. The method according to claim 13, wherein the content constructs include a transformation of the video content to one or more other modalities.

* * * * *